(12) United States Patent
Forbes et al.

(10) Patent No.: US 9,241,078 B2
(45) Date of Patent: Jan. 19, 2016

(54) VIRTUAL CONTACT IDENTIFIER

(75) Inventors: Scott C. Forbes, Redmond, WA (US); Ross Cutler, Redmond, WA (US); Timothy M. Moore, Bellevue, WA (US); Jeremy T. Buch, Louisville, CO (US); Anthony J. Bawcutt, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 2054 days.

(21) Appl. No.: 11/770,588

(22) Filed: Jun. 28, 2007

(65) Prior Publication Data

US 2009/0003569 A1    Jan. 1, 2009

(51) Int. Cl.
*H04L 12/26* (2006.01)
*H04L 12/66* (2006.01)
*H04M 15/06* (2006.01)

(52) U.S. Cl.
CPC ..................... *H04M 15/06* (2013.01)

(58) Field of Classification Search
USPC ............. 370/352; 455/435.3; 380/255; 707/3
See application file for complete search history.

(56) References Cited

U.S. PATENT DOCUMENTS

| | | | |
|---|---|---|---|
| 6,970,547 | B2 | 11/2005 | Andrews et al. |
| 7,107,312 | B2* | 9/2006 | Hackbarth ........... G06Q 10/107 709/204 |
| 7,640,006 | B2* | 12/2009 | Portman et al. ............ 455/412.1 |
| 2003/0023691 | A1 | 1/2003 | Knauerhase |
| 2004/0166832 | A1* | 8/2004 | Portman et al. ............ 455/412.1 |
| 2005/0008140 | A1* | 1/2005 | Bala et al. ................. 379/265.04 |
| 2005/0148351 | A1 | 7/2005 | Reding et al. |
| 2006/0034430 | A1 | 2/2006 | Liakis |
| 2006/0177030 | A1 | 8/2006 | Rajagopalan et al. |
| 2006/0189315 | A1 | 8/2006 | Matsubara et al. |
| 2006/0190591 | A1 | 8/2006 | Bobde et al. |
| 2007/0014244 | A1 | 1/2007 | Srinivasan et al. |
| 2007/0027921 | A1 | 2/2007 | Alvarado et al. |

(Continued)

FOREIGN PATENT DOCUMENTS

WO    WO0158172 A3    8/2001

OTHER PUBLICATIONS

Karadkar, et al. "Employing Smart Browsers to Support Flexible Information Presentation in Petri net-based Digital Libraries," Center for the Study of Digital Libraries and Department of Computer Science, Texas A&M University, last viewed Feb. 20, 2008, 15 pages.
Walker. "Simplicity," http://server.ist-simplicity.org/download.php?OID=164395&FILENAME=D1001-Project%20Presentation.pdf, May 3, 2004, 36 pages.

(Continued)

*Primary Examiner* — Wutchung Chu
(74) *Attorney, Agent, or Firm* — Andrew Smith; Jim Ross; Micky Minhas

(57) ABSTRACT

The claimed subject matter provides a system and/or a method that facilitates enhancing connectivity associated with data communications. An interface can receive a portion of communication state data, wherein the communication state data is related to at least one of a data communication mode and a user context state. A routing component can evaluate the portion of communication state data to identify an optimized data communication mode, wherein the optimized data communication mode is dynamically linked to a virtual contact identifier. Moreover, the routing component can automatically and seamlessly employ an optimized communication session utilizing the dynamically identified optimized data communication mode based upon an activation of the virtual contact identifier.

20 Claims, 10 Drawing Sheets

(56) References Cited

U.S. PATENT DOCUMENTS

| | | | |
|---|---|---|---|
| 2007/0124288 A1* | 5/2007 | Swanson et al. | 707/3 |
| 2008/0049637 A1* | 2/2008 | Morrill | H04L 65/80 370/252 |
| 2008/0063201 A1* | 3/2008 | Wormald et al. | 380/255 |

OTHER PUBLICATIONS

Honal, et al. "Identifying User State Using Electroencephalographic Data," Workshop MMMP, ICMI, http://www.idiap.ch/ICMI05/pdf/MMMP_paper13.pdf, Oct. 2005, 8 pages.

* cited by examiner

VIRTUAL CONTACT IDENTIFIER

BACKGROUND

Technological advances in computer hardware, software and networking have lead to increased demand for electronic information exchange rather than through conventional techniques such as paper correspondence, for example. Such electronic communication can provide split-second, reliable data transfer between essentially any two locations throughout the world. Many industries and consumers are leveraging such technology to improve efficiency and decrease cost through web-based (e.g., on-line) services. For example, consumers can purchase goods, review bank statements, research products and companies, obtain real-time stock quotes, download brochures, etc. with the click of a mouse and at the convenience of home.

In light of such technological advances, people in general tend to be more and more concerned about being connected and/or available for various communications such as cell phone calls, text messages, emails, instant messages, land line phone calls, voice mails, etc. With the rapid pace of today's society, being available and/or reachable on a constant basis is fitting for busy lifestyles albeit personal or business. For example, a professional in a meeting may find it extremely necessary to be reached via text message from a family member indicating safe arrival to a destination. In another example, walking the dog on a nice sunny day can be seen as the perfect opportunity to maximize time by enjoying the weather and contacting an old friend on a mobile communication device.

In general, there are a vast number of data communication modes available. For example, data communication modes can include, but are not limited to, electronic mail (email), Internet Protocol (IP) telephony, web mail, web-browsing, text messaging, cellular devices, mobile communication devices, etc. Yet, with all the available data communication modes that can be leveraged, issues surrounding availability can still arise/exist. Furthermore, each data communication mode can be linked to a distinct number, alias, address, etc. which can be an overwhelming amount of information to remember and/or store in order to contact a person, place, business, etc. For example, to contact one individual, there can be a phone number, a cell number, an email address, an instant messaging alias, a pager number, a work phone number, etc.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate employing a virtual contact identifier to initiate an optimized communication session based on user communication state data. A routing component can evaluate a portion of communication state data received via an interface in order to dynamically select an optimal data communication mode. The routing component can employ a virtual contact identifier that can be logically linked to the optimal data communication mode, wherein a communication session can be initiated upon the activation of the virtual contact identifier. In general, the virtual contact identifier can be associated to an identity (e.g., person, user, machine, device, component, etc.) and a data communication mode associated with that identity to enhance connectivity and/or availability of such identity. The routing component can continuously evaluate communication state data in order to identify an optimal data communication mode, wherein such optimal data communication mode can be linked to the virtual contact identifier in real time.

In accordance with one aspect of the claimed subject matter, the routing component can utilize a security component that allows security levels associated with at least one of an incoming data communication or the optimal data communication to correspond (e.g., match or exceed). Thus, data communications (e.g., incoming data communications, optimal data communication modes, received communication state data, etc.) employed with the virtual contact identifier and/or the routing component can be protected with various security techniques and/or mechanisms. Furthermore, the subject innovation can utilize a cross-modality component that can enable seamless data transmission associated with the routing component by enabling data conversions between various formats and/or data modalities. In other aspects of the claimed subject matter, methods are provided that facilitate evaluating communication state data in order to link a virtual contact identifier to an optimized communication session.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
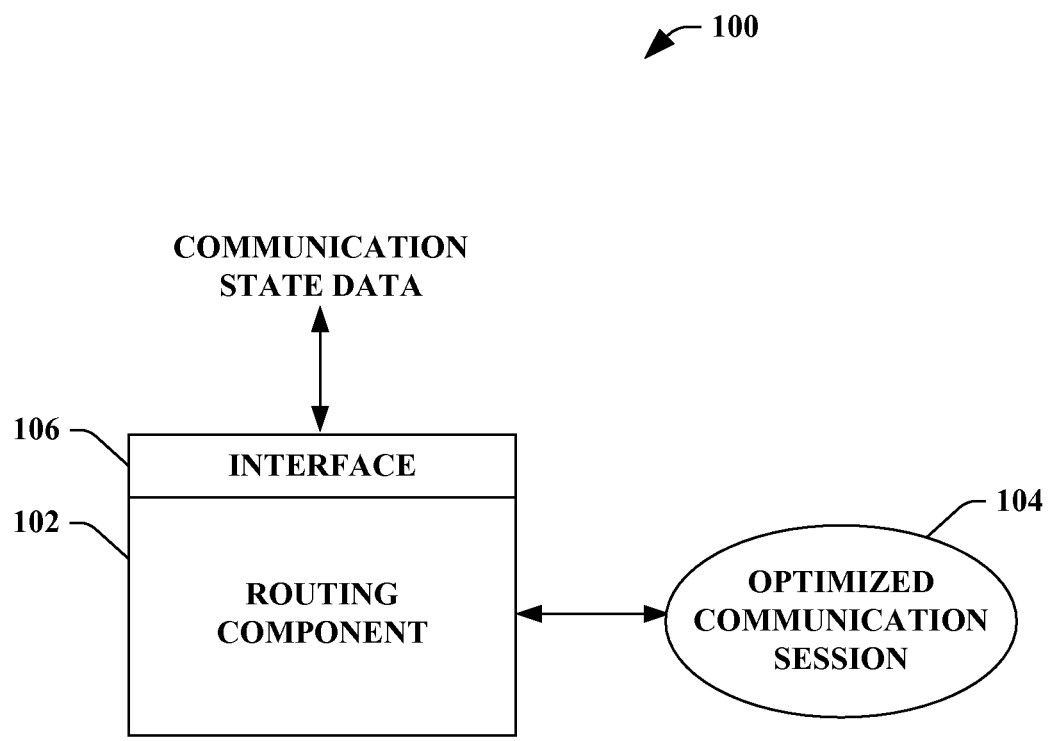
FIG. 1 illustrates a block diagram of an exemplary system that facilitates evaluating communication state data in order to link a virtual contact identifier to an optimized communication session.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "server," "store," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates evaluating communication state data in order to link a virtual contact identifier to an optimized communication session. The system 100 can include a routing component 102 that can receive a portion of communication state data via an interface component 106 (discussed in more detail below), wherein the routing component 102 can ascertain an optimized data communication mode to link to a virtual contact identifier to initiate an optimized communication session 104. The routing component 102 can dynamically and seamlessly link a virtual contact identifier to an identified optimized data communication mode based at least in part upon evaluation of a portion of communication state data. In particular, the routing component 102 can synchronously link the virtual contact identifier to the ascertained data communication mode such that the virtual contact identifier is utilized to initiate, activate, and/or open the data communication session rather than utilizing data communication forwarding mechanisms and/or techniques. In general, the system 100 allows a virtual contact identifier to be logically linked to an individual and any suitable data communication mode/device associated with the individual. It is to be appreciated that the data communication mode/device can be any suitable device, network, message, session, configuration data, and/or any combination thereof. In particular, the term "mode" can be defined as a method of communication that has value on its own as a communication medium. For instance, a mode can include voice, text, video, application sharing, whiteboarding, etc.

The routing component 102 can receive communication state data that can be evaluated in order to ascertain an optimized data communication mode, wherein the communication state data can be associated with available data communication modes (e.g., voice, text, video, application sharing, whiteboarding, etc.), available devices (e.g., a telephone, a house phone, a cellular device, a mobile phone, a mobile device, a smartphone, a portable digital assistant (PDA), a computer, a portable PC, a personal computer (PC), a handheld, a mobile communication device, a laptop, a media device, a text-messaging component, an electronic mail (email), a pager, an instant message component, mobile personal computer (PC), a desktop, media component, etc.), a user context state (e.g., user location, user environment surroundings, user communicative options, etc.) available networks, available communication networks, available communication protocols, user contextual data (e.g., user location, user state, etc.), data communication mode resource and/or cost, data communication mode constraints, user-defined preferences (e.g., costs, priority listing of devices, priority listing of networks, etc.), robustness of channel (e.g., data communication strength, etc.), likelihood of being dropped, user environment surroundings, cost, power status of devices, device-efficiency (e.g., device A is more efficient with communicating in the optimal mode, etc.), incoming data communication mode and compatibility, etc. Thus, the routing component 102 can evaluate a portion of the communication state data in order to identify an optimized data communication mode in which to initiate the optimized communication session 104 upon the activation and/or employment of a virtual contact identifier linked to such optimized communication mode. In other words, the routing component 102 can employ a virtual contact identifier that is dynamically linked and continuously associated with the identified optimized data communication mode. It is to be appreciated that the virtual contact identifier can be most any suitable identifier related to a data communication mode such as, but not limited to, a number, alpha-numeric, a letter, a sound, a graphic, an icon, a motion, a home phone number, a telephone number, an email address, an alias, a picture, a government issued identifier with a portion of personal data (e.g., a social security number, etc.), an identification from a third-party commercial service, or an identifier from a service provider, and/or most any suitable combination thereof.

For example, a user can be reached with a plurality of data communication modes such as email, instant messaging, cellular phone, home phone, home telephone number, etc. At a first moment, the routing component 102 can identify the cellular phone as the optimal data communication mode based upon evaluating communication state data, wherein the cellular phone can be synchronously linked to a virtual contact identifier. Thus, any incoming communication to the virtual contact identifier will be directly connected to the cellular phone. It is to be appreciated that the initiation of the virtual contact identifier provides a direct linkage to the cellular phone rather than employing forwarding techniques/mechanisms. Moreover, at a second moment, the routing component 102 can identify a device being identified, a home telephone number, the combination of the two, a user's location that happens to coordinate with their street address, etc. as the optimal data communication mode based upon evaluating the communication state data, wherein such data communication mode can be dynamically and seamlessly linked to the virtual contact identifier. Thus, upon activation and/or creation of the virtual contact identifier, a communication session can be employed utilizing the home phone (e.g., the current optimal data communication mode). It is to be appreciated that the routing component 102 can continuously identify an optimized data communication mode that can be synchronously linked to the virtual contact identifier.

In addition, the system 100 can include any suitable and/or necessary interface component 106 (herein referred to as "interface 106"), which provides various adapters, connectors, channels, communication paths, etc. to integrate the routing component 102 into practically any operating and/or database system(s) and/or with one another. In addition, the interface component 106 can provide various adapters, connectors, channels, communication paths, etc., that provide for interaction with the routing component 102, optimized communication session 104, and any other device and/or component associated with the system 100.

Figure 2:
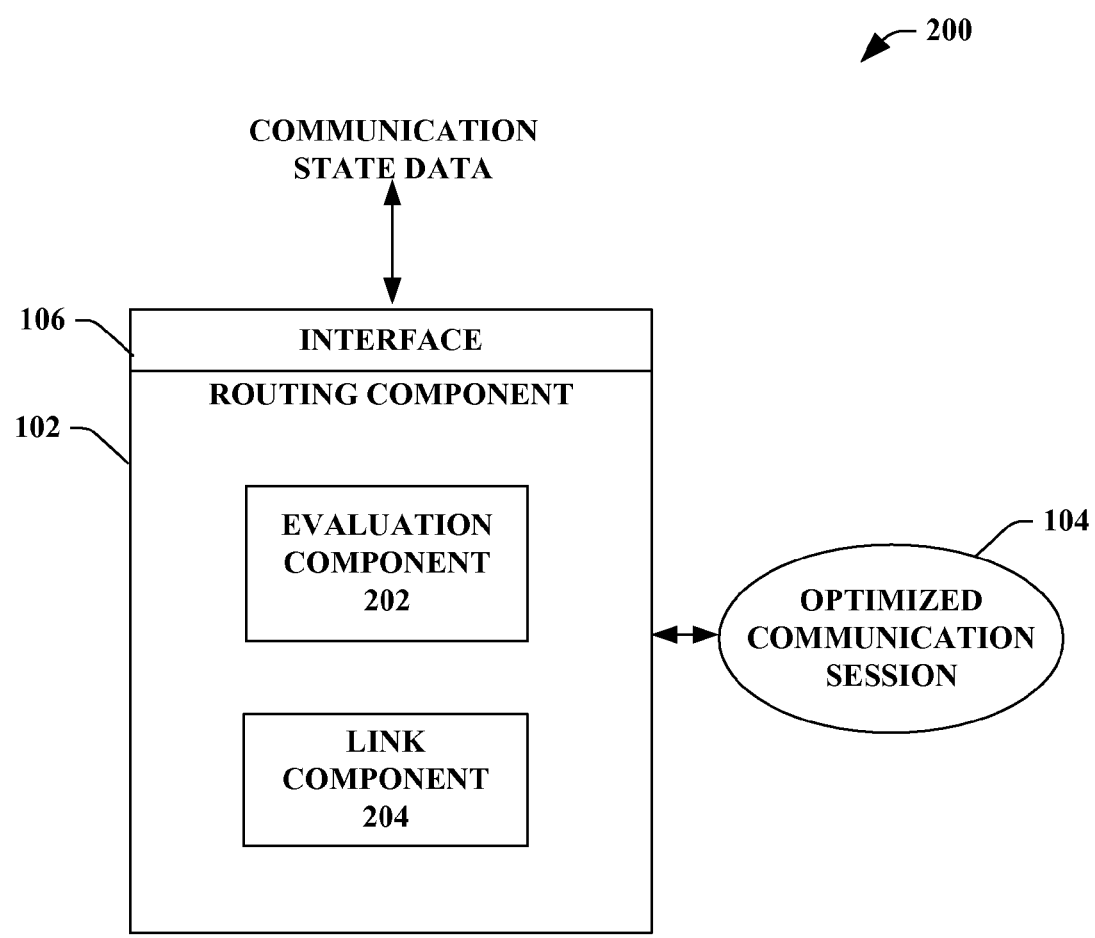
FIG. 2 illustrates a block diagram of an exemplary system that facilitates utilizing an optimized communication session from a plurality of available data communication modes with a single virtual contact identifier.

FIG. 2 illustrates a system 200 that facilitates utilizing an optimized communication session from a plurality of available data communication modes with a single virtual contact identifier. The system 200 can include the routing component 102 that can identify an optimized data communication mode (e.g., based on evaluating a portion of communication state data) in which to dynamically and seamlessly link to a virtual contact identifier. The virtual contact identifier can be utilized to implement the optimized communication session 104 based at least in part upon the logical association with the dynamically identified optimized data communication mode. For example, the virtual contact identifier can be logically representative of a plurality of data communication modes, wherein at any given moment/instance, the virtual contact identifier can be associated with an optimized data communication mode ascertained by evaluating a portion of communication state data.

The system 200 can include an evaluation component 202 that can monitor a portion of received communication state data. As discussed, the communication state data can be associated with available data communication modes (e.g., voice, text, video, application sharing, whiteboarding, etc., utilizing email, cell phone, computer, etc.), available devices (e.g., a telephone, a house phone, a cellular device, a mobile phone, a mobile device, a smartphone, a portable digital assistant (PDA), a computer, a portable PC, a personal computer (PC), a hand-held, a mobile communication device, a laptop, a media device, a text-messaging component, an electronic mail (email), a pager, an instant message component, mobile personal computer (PC), a desktop, media component, etc.), available networks, available communication networks, available communication protocols, user contextual data (e.g., user location, user state, etc.), data communication mode resource and/or cost, data communication mode constraints, user-defined preferences (e.g., costs, priority listing of devices, priority listing of networks, etc.), robustness of channel (e.g., data communication strength, etc.), likelihood of being dropped, user environment surroundings, cost, power status of devices, etc. Thus, by monitoring a portion of the communication state data, the evaluation component 202 can select an optimized data communication mode. It is to be appreciated that the evaluation component 202 can continuously and dynamically monitor communication state data in order to select a data communication mode to link to the virtual contact identifier.

For instance, a user can be contacted using a cell phone number for a mobile device, an email address for email, and/or a home phone number for a land line. Rather than attempting each data communication mode to contact the user, a virtual contact identifier can be linked to the data communication mode (e.g., voice, text, video, application sharing, whiteboarding, etc.) that is optimal to enable communications. For instance, the user may be in a car, where the optimal data communication mode can be the mobile device in which the virtual contact identifier can be linked therewith. At another moment, the user can be at home without the mobile device, where the optimal data communication mode can be the land line in which the virtual contact identifier can be seamlessly linked therewith. Thus, the virtual contact identifier can be associated with an optimized data communication mode in real time to enhance employment of devices, protocols, networks, servers, email, instant messaging, modes of communication, etc.

The system 200 can include a link component 204 that allows a virtual contact identifier to be associated with an optimal data communication mode. Rather than forwarding an incoming data communication mode to a disparate communication mode, the link component 204 can utilize a logical representation to allow the virtual contact identifier to be associated with an optimized data communication mode. For example, activating the virtual contact identifier can initiate the optimized data communication mode from a plurality of data communication modes rather than having to select a contact identifier (e.g., phone numbers, cell phone numbers, email address, instant messaging alias, land line numbers, URI, SIP, etc.) for activation of a specific data communication mode (e.g., cell phone, mobile device, email, instant messaging, land line, laptop, etc.). It is to be appreciated that the link component 204 can provide logical representations for most any suitable data communication mode identified as an optimal choice in real time based at least in part upon evaluation of a portion of the communication state data.

Figure 3:
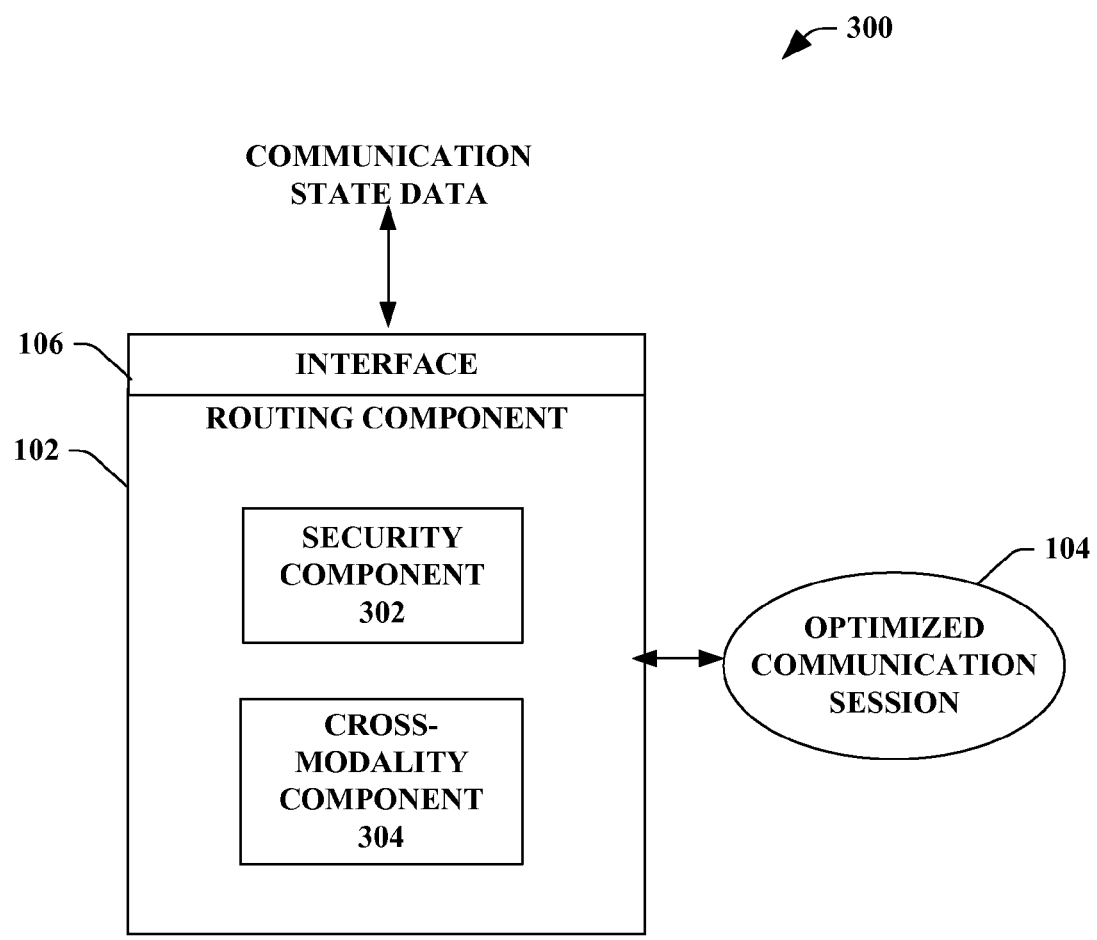
FIG. 3 illustrates a block diagram of an exemplary system that facilitates employing a virtual contact identifier to initiate an optimized communication session based on user communication state data.

FIG. 3 illustrates a system 300 that facilitates employing a virtual contact identifier to initiate an optimized communication session based on user communication state data. The system 300 can include the routing component 102 that can employ a virtual contact identifier logically linked to an optimized data communication mode for improved connectivity. In general, the interface can receive communication state data (e.g., user state, user context, preference information, data communication modes available, etc.), wherein the routing component can employ the information to identify amongst a plurality of communication modes (e.g., available devices, networks, communication protocols, an optimal device, network, and/or communication protocol) to route a communication to a user. It is to be appreciated that the data communication mode/device can be any suitable device, network, message, session, configuration data, and/or any combination thereof. In particular, the term "mode" can be defined as a method of communication that has value on its own as a communication medium. For instance, a mode can include voice, text, video, application sharing, whiteboarding, etc. The system 300 can utilize a virtual contact identifier that allows for seamless coupling of devices, networks, communication protocols as well as communication modalities in order to deliver a communication to an individual or entity.

For example, a virtual contact identifier can be associated with multiple devices and based on communication state data, user location, state, preferences, etc., an incoming communication (e.g., e-mail, call, video, etc.) can be executed on the most suitable device/communication mode using a most appropriate network and/or protocol. The system 300 can factor variables such as, but not limiting to, cost, constraints, preferences, robustness of channel, strengths, likelihood of being dropped (e.g., current wireless signal is fine, but driving toward known dead zone), whether the callee is in a noisy environment (e.g., stadium, street, etc), whether the called party is in a private environment (e.g., office, etc.), and/or most any suitable variable that can affect a data communication mode.

The system 300 can evaluate any suitable information related to a user and/or a data communication mode associated with a user. For example, information about user state can be obtained from a variety of sources such as: (1) Global Positioning Software (GPS), (2) applications the user is working with, (3) time of day, (4) user's calendar, (5) visual monitors (e.g., detect frowns, smiles, etc.), (6) voice recognition (e.g., can also identify stress in user's voice, sense of urgency, etc.), (7) movement of user, (8) location of user (e.g., at the office, within a car, walking, etc.), most any suitable data related to a user to provide context, etc. The state/context information can be used to modify the linking between the virtual contact identifier and an optimized data communication mode and facilitate converging on optimal technique/mechanism for communicating.

The system 300 can further utilize a security component 302 that can provide a security technique and/or protective mechanism to secure data related to a data communication mode and/or data transmitted thereupon. The security component 302 can employ security and/or authentication schemes to ensure communications are linked to proper individuals employing appropriate communication schemes based on content/context of communication. In other words, the security component 302 can ensure a particular incoming data communication can be linked to the appropriate virtual contact identifier as well as ensure the security associated with the incoming data communication is suitable for the optimized data communication mode and/or optimized data communication session 104.

For example, the security component 302 can identify a security level with an incoming data communication targeted for the virtual contact identifier and ensure the security level associated with the optimal data communication mode is comparable (e.g., provides equal or exceeding protection in comparison to the incoming data communication security level). For example, if a message is identified as highly confidential (e.g., through evaluation of the communication state data) the communication can be routed/linked/transferred, through a more secure mechanism (e.g., hard-wire call), even though wireless communication may be most convenient/optimal. In addition, the incoming data communication can be blocked and/or restricted (e.g., error message, message service, informative communication to identity attempting to contact with the virtual contact identifier, etc.) to the optimal data communication mode based on the incoming data communication security level not being comparable to the optimal data communication mode security level. Thus, the security component 302 can identify various security characteristics associated with an incoming data communication (e.g., via the virtual contact identifier) and enable the identified optimal data communication mode to include such requirements/characteristics. In addition, it is to be appreciated that the security component 302 can utilize data protection related to data added and/or lost upon linking incoming data communications to various data communication modes (e.g., cross-modality, etc.) associated with the virtual contact identifier.

The system 300 can further employ a cross-modality component 304 that enables incoming data communications to be seamlessly linked to various data communication modes. For example, an incoming voice communication can be dynamically converted and/or manipulated to an email communication. In another example, an incoming data communication can be transcribed for a data communication mode that may not support voice (e.g., instant messaging, email, text messaging, etc.). In general, the cross-modality component 304 can facilitate transmitting data from a data communication mode and respective format to a disparate data communication mode and respective format. It is to be appreciated that cross-modality component 304 can enable seamless and dynamic transmission of data between any suitable number of data communication modes (e.g., email, telephone, cellular phone, instant messaging, text message, short message system, (SMS), voice, video transmission, etc.) and/or respective data formats.

Figure 4:
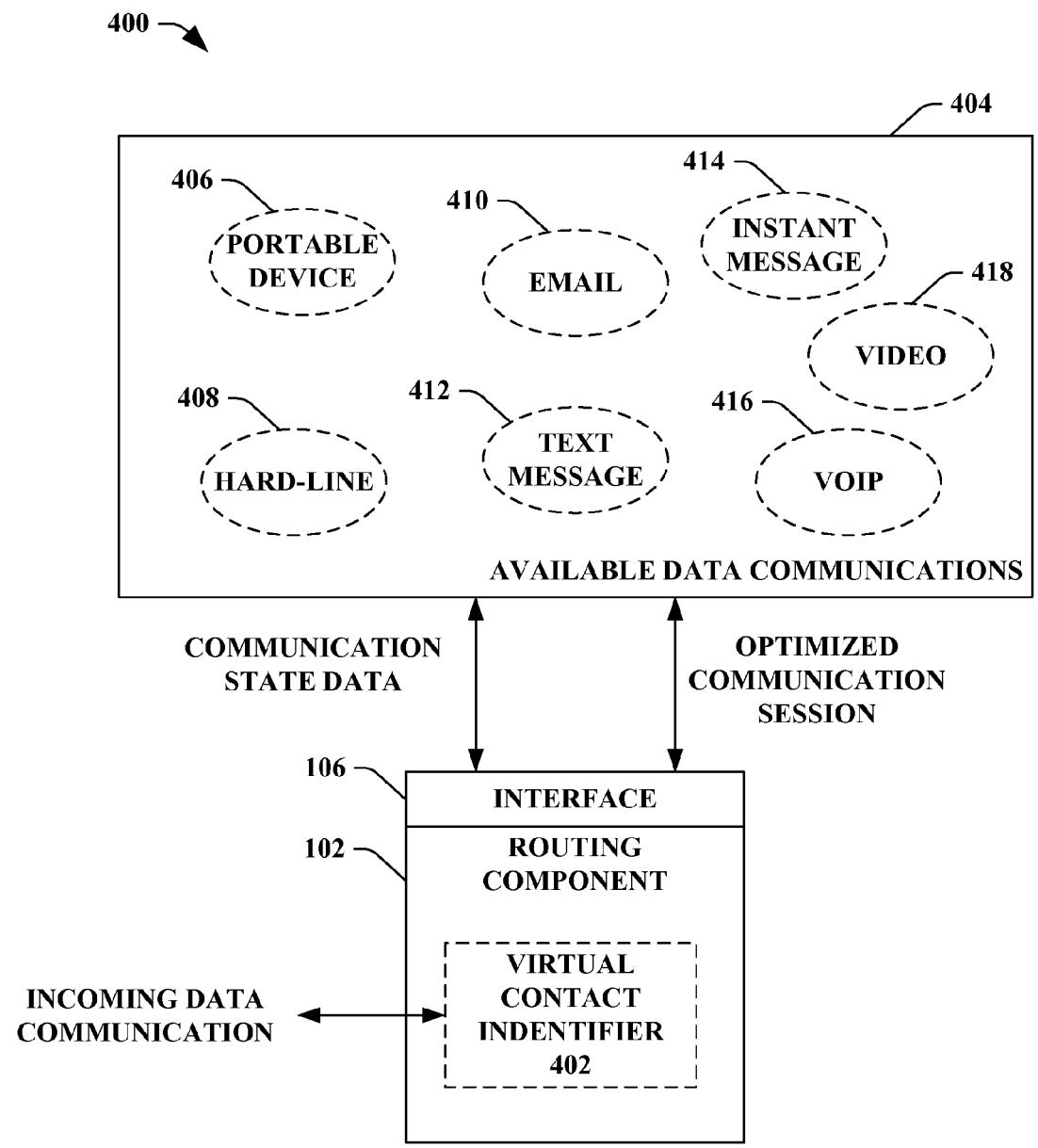
FIG. 4 illustrates a block diagram of an exemplary system that facilitates identifying an optimized communication session to link to a virtual contact identifier to enable enhanced data communications.

FIG. 4 illustrates a system 400 that facilitates identifying an optimized communication session to link to a virtual contact identifier to enable enhanced data communications. The system 400 can include the routing component 102 that can utilize a virtual contact identifier 402 to associate and logically represent an optimized data communication mode. The routing component 102 can evaluate communication state data associated with available data communications 404 in order to identify an optimal and/or best suited data communication mode to link to the virtual contact identifier 402. For example, the available data communications 404 can be related to a particular user to which an incoming data communication can be targeted. The incoming data communication can be linked to the identified data communication mode which is optimal and/or best for that particular instant from the available data communications 404. The available data communications 404 can be, but are not limited to, a portable device 406, a hard-line 408, email 410, text message 412, instant message 414, Voice Over Internet Protocol (VoIP) 416, video 418, etc. It is to be appreciated that any suitable data communication can be utilized with the subject innovation and the above list is not to be exhaustive and/or limiting.

For instance, the routing component 102 can ascertain a best suited data communication by evaluating communication state data such as, but not limited to, data communication modes, incoming data communications, available devices, available networks, available communication networks, available communication protocols, user contextual data, user location, user state, data communication mode resource and/or cost, data communication mode constraints, user-defined preferences (e.g., costs, priority listing of devices, priority listing of networks, etc.), robustness of channel (e.g., data communication strength, etc.), likelihood of being dropped, user environment surroundings, cost, power status of devices, etc. Thus, based on characteristics and/or details surrounding communication state data related to a particular user, an incoming data communication can be linked to the virtual contact number 402 in order to connect via the optimally identified data communication mode (e.g., mobile device, cell phone, land line, text message, email, video, voice, etc.). In other words, an optimized communication session can be employed based at least in part upon the incoming data communication being associated with the optimized data communication mode implemented by the virtual contact identifier 402.

Figure 5:
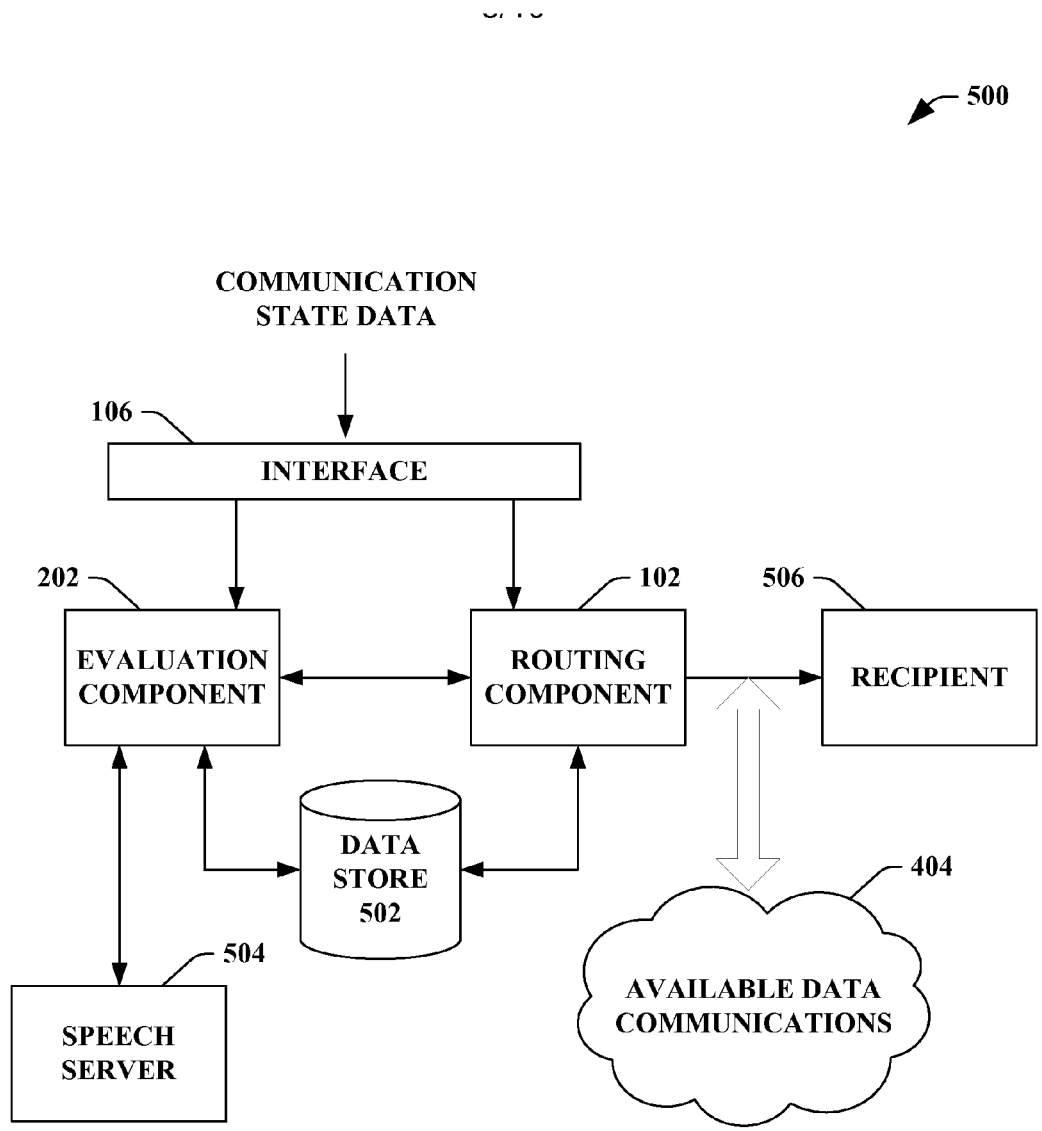
FIG. 5 illustrates a block diagram of exemplary system that facilitates dynamically linking a virtual contact identifier to an optimized data communication mode based on user contextual data.

FIG. 5 illustrates a system 500 that facilities dynamically linking a virtual contact identifier to an optimized data communication mode based on user contextual data. In general, the system 500 allows a virtual contact identifier to be linked to an individual and any suitable data communication mode/device associated with the individual. The system 500 can include the routing component 102 that can receive a portion of communication state data via the interface 106, wherein the portion of communication state data can be evaluated by the evaluation component 202 in order to identify an optimal data communication mode. The evaluation component 202 can further utilize a speech server 504 that enables voice data to be converted to disparate mediums (e.g., voice to text, voice to email, voice to video, etc.) utilizing various speech recognition techniques/mechanisms.

The system 500 can further include a data store 502 that can include any suitable data related to the routing component 102, the optimized data communication session 104, interface 106, communication state data, data communication modes, etc. For example, the data store 502 can include, but is not limited to including representations of communication state data, data communication mode data, incoming data communications, available device data, available network data, available communication networks data, available communication protocols, user contextual data, user location, user state, data communication mode costs, data communication mode constraints, user-defined preferences, robustness of channel, data communication mode strength, likelihood of being dropped, user environment surroundings, etc. and/or any other suitable data related to the system 500.

Moreover, the system 500 can be utilized in most any suitable environment such as, but not limited to, an office, a workplace, a business, a home, etc. For instance, a company can include employees who have assigned virtual contact identifiers A, B, C, and D. If you want to contact employee 1, you can activate the contact identifier A, which will link to the optimal data communication mode for the employee at that particular moment. It is to be appreciated that the virtual contact identifier can be utilized outside and/or inside the company. Thus, the virtual contact identifier is connected to the identity as well as the modality of a particular data communication mode that is the optimal selection. Furthermore, the virtual contact identifier can be utilized for meetings, wherein a meeting can be sent to a group of people utilizing the virtual contact identifiers. Thus, the meeting can be conducted with the attendees on their respective optimal data communication modes identified in real time.

It is to be appreciated that the data store 502 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 502 of the subject systems and methods is intended to comprise, without being limited to, these and any other suitable types of memory. In addition, it is to be appreciated that the data store 502 can be a server, a database, a hard drive, a pen drive, an external hard drive, a portable hard drive, and the like.

The routing component 102 can select an optimal and/or best data communication mode from the available data communications 404 based at least in part upon evaluating a portion of communication state data (e.g., available devices, available networks, available protocols, environment conditions, user context, user location, user preferences, etc.). With the optimal data communication mode identified, the virtual contact identifier can be linked to allow incoming data communications to be implemented on such mode to contact a recipient 506. As discussed, the virtual contact identifier can be any suitable place-holder and/or identifier to represent the combination of the recipient and a particular data communication mode. The virtual contact identifier can be, for instance, a number, alpha-numeric, a letter, a sound, a graphic, an icon, a motion, and/or most any suitable combination thereof. For instance, in order to contact Bob (the recipient 506) on one of his available communication devices 404 (e.g., cell phone, portable digital assistant (PDA), laptop via email, desktop via instant message, etc.), a virtual contact identifier can be utilized to connect to the optimal data communication mode. Thus, to contact Bob on an optimally selected data communication mode, the virtual contact identifier can be activated to initiate an optimized communication session.

Figure 6:
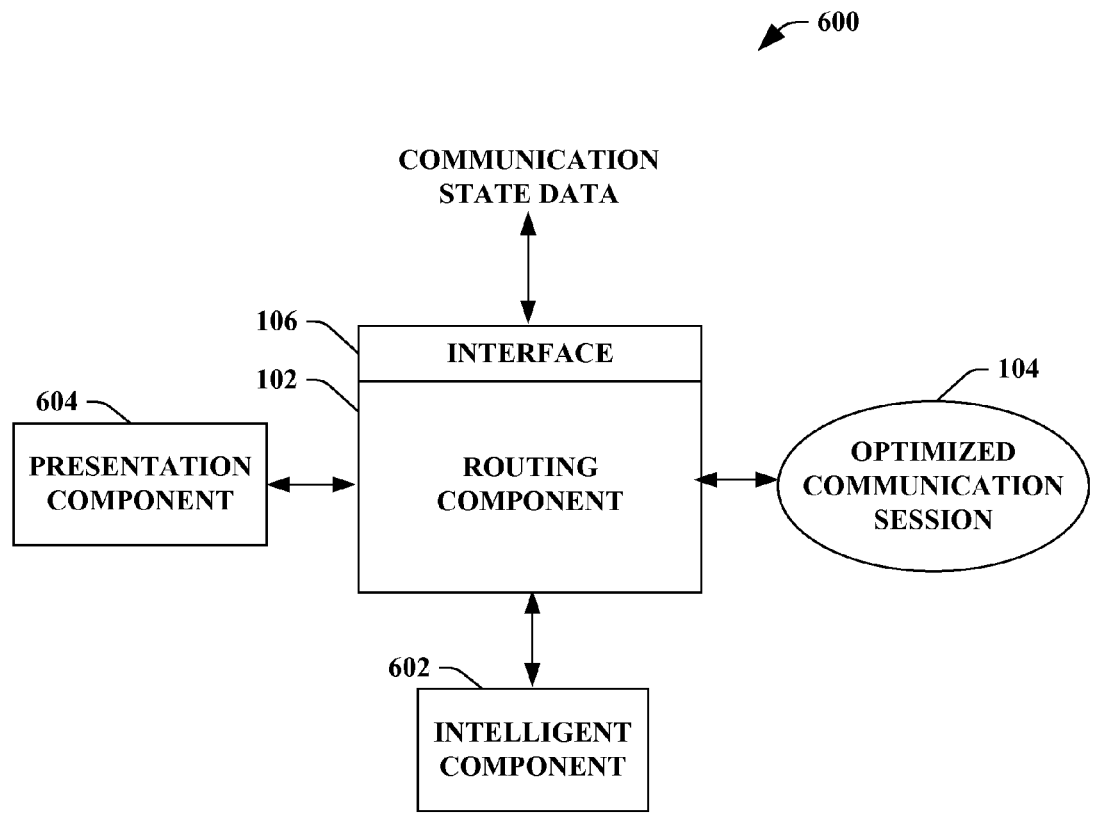
FIG. 6 illustrates a block diagram of an exemplary system that facilitates employing a virtual contact identifier that enables connectivity to an optimized data communication mode selected from a plurality of available data communication modes.

FIG. 6 illustrates a system 600 that employs intelligence to facilitate employing a virtual contact identifier that enables connectivity to an optimized data communication mode selected from a plurality of available data communication modes. The system 600 can include the routing component 102, the interface 106, and/or the optimized communication session 104. It is to be appreciated that the routing component 102, the optimized communication session 104, and the interface 106 can be substantially similar to respective components, sessions, and interfaces described in previous figures. The system 600 further includes an intelligent component 602. The intelligent component 602 can be utilized by the routing component 102 to facilitate identifying an optimized data communication mode and associating a virtual contact identifier therewith in order to enhance data connectivity.

For example, the intelligent component 602 can infer communication state data, data communication modes, incoming data communications, available devices, available networks, available communication networks, available communication protocols, user contextual data, user location, user state, data communication mode costs, data communication mode constraints, user-defined preferences, robustness of channel, data communication mode strength, likelihood of being dropped, user environment surroundings, etc. In another example, machine learning systems (e.g., implicitly as well as explicitly trained) can be employed in connection with the system 600 so as to provide automated action in connection with the invention. It is to be appreciated that the invention can operate transparently (e.g., working in the background) as well as actively with the user (e.g., providing feedback to the user, augmenting routing decisions in front of the user, etc.). Over time, a context filter in accordance with the system 600 can be tuned to provide highly personalized routing capabilities. Furthermore, user feedback can also be used to further train the system.

It is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The routing component 102 can further utilize a presentation component 604 that provides various types of user interfaces to facilitate interaction between a user and any component coupled to the routing component 102. As depicted, the presentation component 604 is a separate entity that can be utilized with the routing component 102. However, it is to be appreciated that the presentation component 604 and/or similar view components can be incorporated into the routing component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the routing component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed after entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
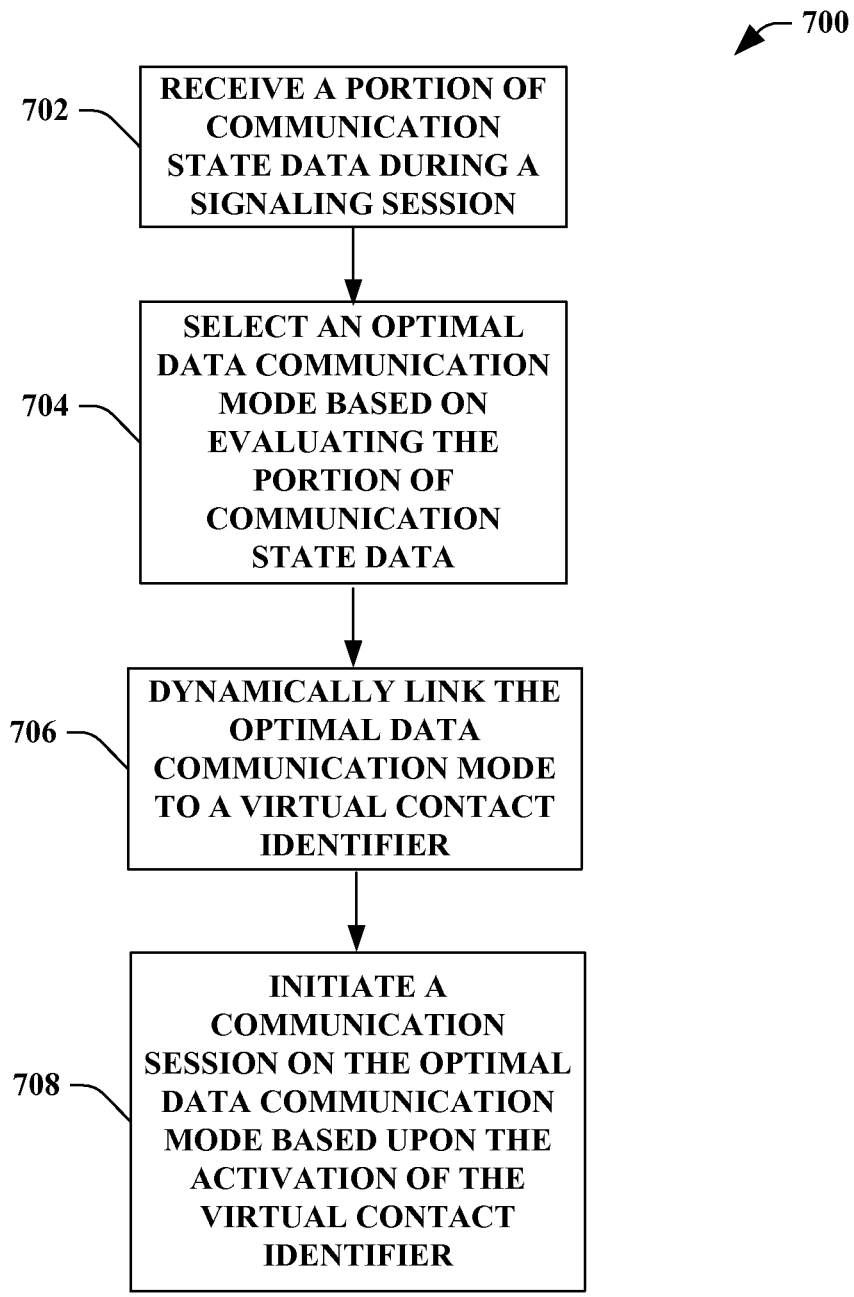
FIG. 7 illustrates an exemplary methodology for evaluating communication state data in order to link a virtual contact identifier to an optimized communication session.
Figure 8:
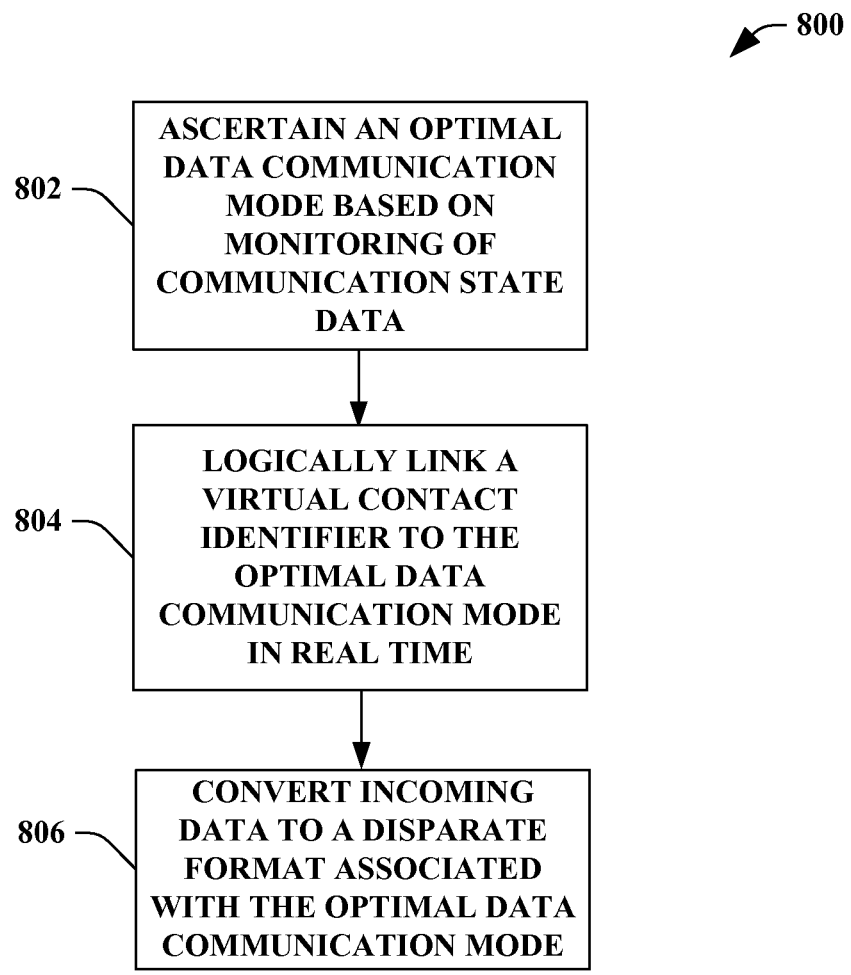
FIG. 8 illustrates an exemplary methodology that facilitates employing a virtual contact identifier to initiate an optimized communication session based on user communication state data.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates evaluating communication state data in order to link a virtual contact identifier to an optimized communication session. At reference numeral 702, a portion of communication state data can be received during a signaling session. The signaling session can be a period in which data can be collected in order to identify an optimal data communication mode based on a portion of communication state data. It is to be appreciated that the communication data can include a virtual contact identifier in order to initiate the optimal data communication. The communication state data can be associated with, for instance, with available data communication modes (e.g., text message, cell phone, land line, email, etc.), available devices (e.g., mobile personal computer (PC), cellular device, laptop, desktop, work phone, etc.), available networks, available communication networks, available communication protocols, user contextual data (e.g., user location, user state, etc.), data communication mode costs, data communication mode constraints, user-defined preferences, robustness of channel, data communication mode strength, likelihood of being dropped, user environment surroundings, cost-comparison between available data communication modes, power status of devices, device-efficiency (e.g., device A is more efficient with communicating in the optimal mode, etc.), incoming data communication mode and compatibility, etc.

At reference numeral 704, an optimal data communication mode can be selected by evaluating the portion of communication state data. For example, the optimal data communication mode can be identified based upon a context gathered from the communication state data, wherein such data communication mode can be dynamically identified in real time. Thus, at one instant, email can be an optimal data communication mode, whereas in a second instant, voice communication can be the optimal data communication mode based upon the real time evaluation of communication state data associated with a user and/or respective available data communication modes.

At reference numeral 706, the optimal data communication mode can be dynamically linked to a virtual contact identifier. It is to be appreciated that the virtual contact identifier can be most any suitable identifier related to a data communication mode such as, but not limited to, a number, alpha-numeric, a letter, a sound, a graphic, an icon, a motion, a home phone number, a telephone number, an email address, an alias, a picture, a social security number, a government issued identifier, an identification from a third-party, an identifier from a service, an identifier from a service provider, and/or most any suitable combination thereof. At reference numeral 708, a communication session can be initiated on the optimal data communication mode based at least in part upon activation of the virtual contact identifier. For example, the virtual contact identifier can be logically linked and represent the optimized data communication mode to enhance connectivity.

FIG. 8 illustrates a method 800 for employing a virtual contact identifier to initiate an optimized communication session based on user communication state data. At reference numeral 802, an optimal data communication mode can be ascertained based upon monitoring a portion of communication state data. It is to be appreciated that the communication state data can be related to available data communication modes (e.g., voice, text, video, application sharing, whiteboarding, etc.), available devices (e.g., a telephone, a house phone, a cellular device, a mobile phone, a mobile device, a smartphone, a portable digital assistant (PDA), a computer, a portable PC, a personal computer (PC), a hand-held, a mobile communication device, a laptop, a media device, a text-messaging component, an electronic mail (email), a pager, an instant message component, mobile personal computer (PC), a desktop, media component, etc.), available networks, available communication networks, available communication protocols, user contextual data (e.g., user location, user state, etc.), data communication mode resource and/or cost, data communication mode constraints, user-defined preferences (e.g., costs, priority listing of devices, priority listing of networks, etc.), robustness of channel (e.g., data communication strength, etc.), likelihood of being dropped, user environment surroundings, cost, power status of devices, device-efficiency (e.g., device A is more efficient with communicating in the optimal mode, etc.), incoming data communication mode and compatibility, etc.

At reference numeral 804, a virtual contact identifier can be logically linked to the optimal data communication mode in real time. For example, the communication state data can be continuously evaluated to select an optimal data communication mode to which a virtual contact identifier can be linked. At reference numeral 806, incoming data can be converted into a disparate format associated with the optimal data communication mode. In other words, any incoming data can be converted to a format corresponding to the selected optimal data communication mode. By enabling such cross-modality between user available data communication modes, communications can be implemented regardless of incoming data format and/or target data communication mode. For example, an incoming voice call can be converted to a text message based upon the optimal data communication mode being text message based on real time evaluations.

Figure 9:
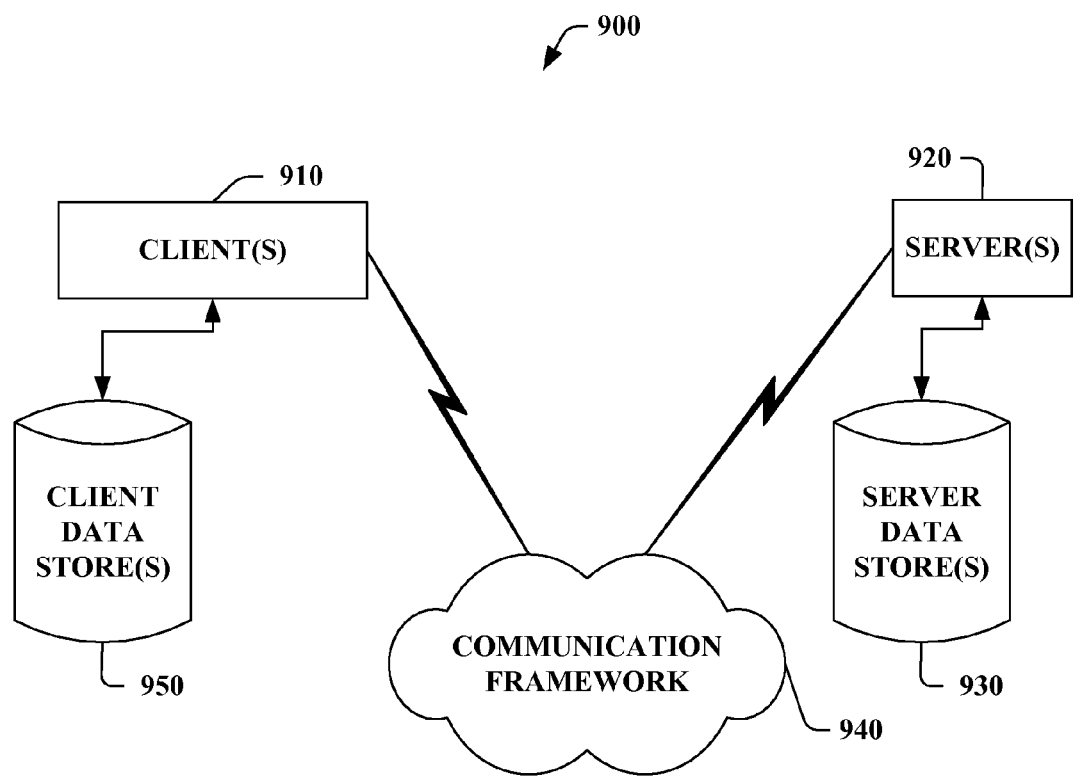
FIG. 9 illustrates an exemplary networking environment, wherein the novel aspects of the claimed subject matter can be employed.
Figure 10:
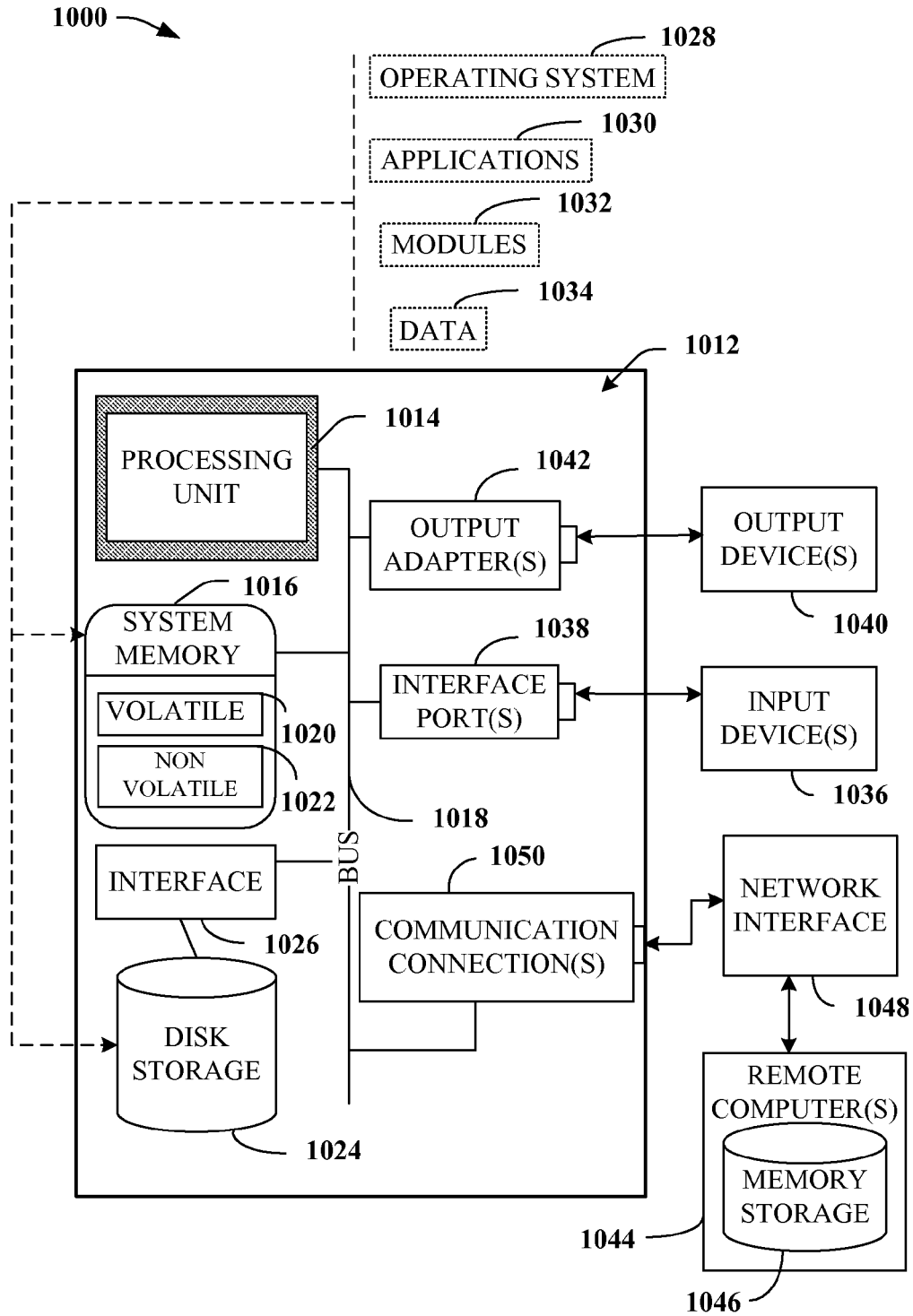
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, a routing component that facilitates employing a virtual contact identifier that can utilize an optimized data communication, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. It is to be appreciated that a client-to-client environment can be employed with the subject innovation, wherein a server need not be utilized. The system 900 includes a communication framework 940 that can be employed to facilitate communications between the client(s) 910 and the server(s) 920. The client(s) 910 are operably connected to one or more client data store(s) 940 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system that facilitates enhancing connectivity associated with data communications, comprising:
   an interface component that receives a portion of communication state data associated with a first user, the communication state data being related to at least one user context state, the at least one user context state comprising data relating to at least a power state of at least one device associated with the first user;
   a routing component that evaluates the portion of communication state data to identify an optimized data communication mode from a plurality of disparate data communication modes, the optimized data communication mode being dynamically linked to a virtual contact identifier associated with the first user based at least in part upon the evaluation of the portion of communication state data;
   the routing component automatically and seamlessly employing an optimized communication session utilizing the dynamically identified optimized data communication mode based upon an activation of the virtual contact identifier by a second user attempting to communicate with the first user associated with the activated virtual contact identifier; and
   a cross-modality component that enables seamless and dynamic data transmission between the plurality of disparate data communication modes in their respective disparate data formats, the plurality of disparate data communication modes being associated with at least one of an incoming data communication from the second user, the optimal data communication mode, or an origin of the incoming data communication, the plurality of disparate data communication modes including at least two of voice, text, video, application sharing and whiteboarding.

2. The system of claim 1, the virtual contact identifier being associated with an identity and at least one data communication mode related to the identity.

3. The system of claim 1, the communication state data being associated with at least one of an available data communication mode, an available device, an available network, an available communication network, an available communication protocol, user contextual data, a user location, a user state, a data communication mode resource, a data communication mode constraint, a user-defined preference, a robustness of channel, a data communication mode strength, a likelihood of being dropped, a user environment surrounding, a resource-comparison between available data communication modes, a device-efficiency, an incoming data communication mode, or a compatibility.

4. The system of claim 1, the virtual contact identifier being at least one of:
   a user-selected number, alpha-numeric sequence, letter, sound, graphic, icon, motion, telephone number, email address, alias, picture, identification for a third-party commercial service, or an identifier for a service provider; or
   a government issued identifier with a portion of personal data.

5. The system of claim 1, the data communication mode being a communication medium that relates to at least one of a device, a network, a message, a session, or configuration data, the device is at least one of a telephone, a land line, a hard-line, a work phone, a house phone, a cellular phone, a mobile phone, a mobile device, a smartphone, a portable digital assistant, a computer, a portable PC, a personal computer (PC), a hand-held, a mobile communication device, a laptop, a media device, a text-messaging component, an electronic mail (email) device, a text message device, a voice call, a pager, an instant message component, or a video communication device.

6. The system of claim 1, the virtual contact identifier being logically representative of the optimal data communication mode identified in real time.

7. The system of claim 1, further comprising an evaluation component that monitors the portion of communication state data in real time in order to select the optimal data communication mode from a plurality of data communication modes associated with the virtual contact identifier.

8. The system of claim 1, further comprising a link component that employs a logical linkage between the virtual contact identifier and the optimal data communication mode in real time.

9. The system of claim 1, further comprising a security component that secures a portion of data related to at least one of an incoming data communication targeted for the virtual contact identifier, the optimized data communication mode, the optimized communication session, or the portion of communication state data.

10. The system of claim 9, the security component ensuring an incoming data communication targeted to the virtual contact identifier being linked to the optimized data communication mode associated with a matching identity.

11. The system of claim 9, the security component identifying a security level with an incoming data communication and ensuring the optimal data communication mode includes a corresponding security level that matches or exceeds the security level for the incoming data communication.

12. The system of claim 9, the security component identifying a security level with the optimal data communication mode and ensuring an incoming data communication mode includes a corresponding security level that matches or exceeds the security level for the optimal data communication mode.

13. The system of claim 12, the routing component employing at least one of the following: a selection of a disparate optimal data communication mode based upon the security level related to the incoming data communication not matching or exceeding the security level of the optimal data communication mode; or a restriction to an incoming data communication based upon the security level related to the optimal data communication mode not matching or exceeding the security level of the incoming data communication.

14. The system of claim 1, the cross-modality component converting data in a first format to data in a second format, at least one of the first format or second format being related to at least one of the incoming data communication or the optimal data communication mode.

15. The system of claim 1, further comprising:
an intelligent component that facilitates connectivity to the optimized data communication mode selected from the plurality of disparate data communication modes; and
a machine learning component that uses user feedback to train the system.

16. A computer-implemented method that facilitates enhancing data communications connectivity, comprising:
receiving a portion of communication state data associated with a first user, the communication state data comprising data communication strength of at least one device associated with the first user;
evaluating the portion of communication state data;
selecting an optimal data communication mode from a plurality of disparate data communication modes based at least in part upon the evaluation;
dynamically linking the optimal data communication mode to a virtual contact identifier associated with the first user;
initiating a communication session with the optimal data communication mode based at least in part upon activation of the virtual contact identifier by a second user attempting to communicate with the first user; and
dynamically converting data from the second user from a first format into a second format corresponding to the selected optimal data communication mode, at least one of the first format or the second format being related to at least one of an incoming data communication, the communication state data, the optimal data communication mode, or the virtual contact identifier, the first format and the second format being associated with their respective plurality of disparate data communication modes including whiteboarding and at least one of voice, text, video and application sharing.

17. The method of claim 16, further comprising:
continuously monitoring communication state data in real time; and
logically linking the virtual contact identifier to the optimal data communication mode in real time.

18. The method of claim 16, the communication state data being associated to at least one of an available data communication mode, an available device, an available network, an available communication network, an available communication protocol, user contextual data, a user location, a user state, a data communication mode resource, a data communication mode constraint, a user-defined preference, a robustness of channel, a likelihood of being dropped, a user environment surrounding, a resource-comparison between available data communication modes, a power status of a device, a device-efficiency, an incoming data communication mode, or a compatibility.

19. A computer-implemented system that facilitates enhancing connectivity associated with data communications, comprising:
means for receiving a portion of communication state data of a first user, the communication state data being related to at least one user context state, the user context state comprising at least one of a power state or data communication strength of at least one device associated with the first user;
means for evaluating the portion of communication state data to identify an optimized data communication mode from a plurality of disparate data communication modes;
means for dynamically linking the optimized data communication mode to a virtual contact identifier associated with the first user based at least in part upon evaluating the portion of communication state data;
means for automatically and seamlessly employing an optimized communication session utilizing the dynamically identified optimized data communication mode based upon an activation of the virtual contact identifier by a second user attempting to communicate with the first user; and
means for dynamic data transmission between the plurality of disparate data communication modes in their respective disparate data formats by enabling an incoming data communication from the second user targeted for the virtual contact identifier that is utilized to connect to the optimized data communication modes, the plurality of disparate data communication modes including application sharing and at least one of voice, text, video and whiteboarding.

20. The system of claim 7, the evaluation component utilizing a speech server by enabling an incoming voice data to be converted to disparate mediums utilizing various speech recognition techniques/mechanisms.

* * * * *